United States Patent [19]
McDermott et al.

[11] 3,737,786
[45] June 5, 1973

[54] RADIO RECEIVER ADAPTED TO MONITOR WARNING SIGNALS

[76] Inventors: John J. McDermott, 1446 Suffolk Avenue, Westchester, Ill. 60153; Francis M. Macken, 800 Washington Boulevard, Oak Park, Ill. 60300

[22] Filed: June 4, 1971

[21] Appl. No.: 149,959

[52] U.S. Cl. ..................325/466, 325/303, 325/366, 325/492, 340/171, 343/205

[51] Int. Cl. ..................H04b 1/06

[58] Field of Search..................325/466, 368, 370, 325/372, 392, 492, 494, 303; 343/205; 340/171

[56] References Cited

UNITED STATES PATENTS

| | | | |
|---|---|---|---|
| 2,958,770 | 11/1960 | Davidson et al. | 325/466 |
| 3,277,374 | 10/1966 | Kobayashi | 325/466 |
| 2,361,585 | 10/1944 | Appel | 325/466 |
| 2,630,525 | 3/1953 | Tomberlin et al. | 325/466 |
| 2,699,493 | 1/1955 | McCullough et al. | 325/466 |
| 2,929,921 | 3/1960 | Clark | 325/466 |

*Primary Examiner*—Albert J. Mayer
*Attorney*—Spencer & Kaye

[57] ABSTRACT

A device, for detecting and demodulating only a transmission of an audio frequency modulated radio frequency carrier signal of a preselected fixed carrier frequency, is selectively interconnected, through switching means, between the demodulating circuit and audio amplification and output circuit of a tunable receiver designed to detect the transmission of audio frequency modulated radio frequency signals of different carrier frequencies. The switching means is further interconnected in the power supply circuit of the tunable receiver so that when the device detects a transmission of a signal at the preselected fixed frequency the switching means provides a power path to the tunable receiver. Simultaneously the switching means impresses a signal, developed in the device, which includes a direct current voltage component and an audio frequency component, on the demodulating and audio amplification circuits in the tunable receiver to suppress signals from the demodulating circuit and permit amplification of the audio frequency component.

9 Claims, 1 Drawing Figure

Patented June 5, 1973 3,737,786
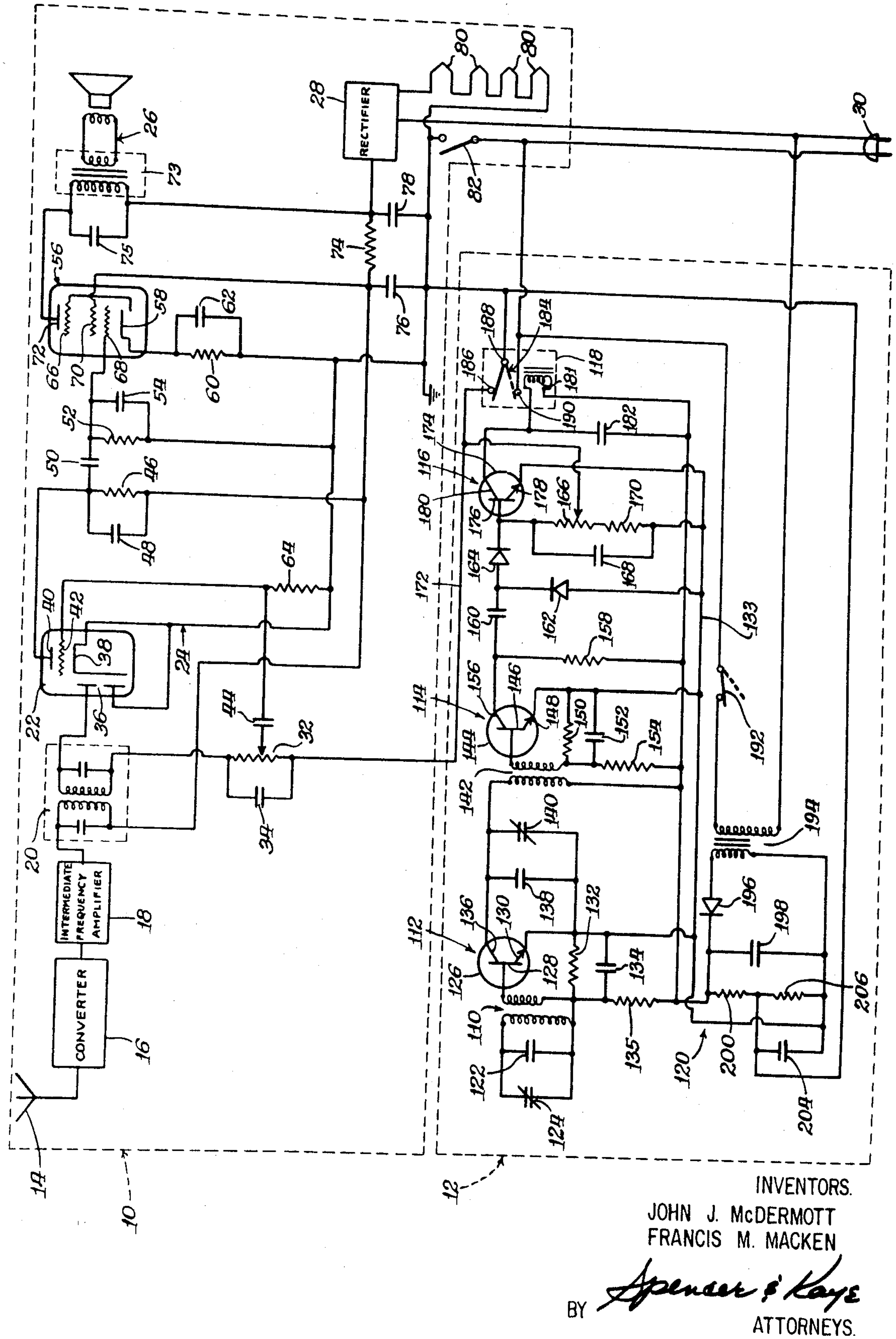
INVENTORS.
JOHN J. McDERMOTT
FRANCIS M. MACKEN
BY Spencer & Kaye
ATTORNEYS.

RADIO RECEIVER ADAPTED TO MONITOR WARNING SIGNALS

BACKGROUND OF THE INVENTION

There are situations that require an efficient and quick system for disseminating information of an emergency nature to large groups of people. Certainly one situation of this nature could arise in the event of an enemy attack on a country such as the United States. Such attack might involve either conventional tools of war or nuclear weapons and, of course, in either event it is extremely important that as many people as possible be alterted immediately.

Because of the critical nature of information in the case of enemy attack the United States government has attempted to provide a warning system which can be used to simultaneously alert every section of the country. An early system used was the Conelrad system in which a warning message could be broadcast on two frequencies, namely 640 and 1,240 kilocycles.

Another system presently in use is the so-called Emergency Broadcast System in which commercial AM and FM broadcasting stations relay information supplied to them by the government. However, any relay system involves inherent delays and it has recently been proposed that a super fast radio frequency system be constructed to warn of enemy nuclear attack. The system tentatively titled Decision Information Distribution System (DIDS) calls for the construction of a number of low-frequency radio transmitter stations throughout the country. These stations will transmit information directly instead of relaying information through existing AM or FM stations.

However, with the use of the present warning system, or the contemplated system, it is apparent that the link to the people is the high frequency receiver. Obviously, to be effective the receiver must be operating and must be tuned to a proper frequency to receive the information being transmitted. It is in this area that critical problems exist, because the receiver may be turned off or may not be tuned to any frequency on which information is being transmitted.

Obviously some means must be provided to insure that a warning signal is emitted by a high-frequency receiver even if it is not turned on for use when the transmission commences. Furthermore, with the use of a system such as DIDS which might be using a transmitting frequency different from those to which the receiver is tuned for normal use, it is important that the receiver be able to detect the DIDS transmission and broadcast it.

SUMMARY OF THE INVENTION

It is an object of the present invention to provide a warning signal receiver which avoids those problems set forth above.

It is a further object of the invention to provide a device which can easily be interconnected with an audio frequency amplifier network of an instrument having a speaker or headphones so that warning signals received by this device will be disseminated from the speaker or headphones.

It is a still further object of the invention to provide means associated with the device which will turn on the instrument if the instrument is not energized when a warning signal transmission commences.

Generally, the above objects are achieved through the use of a device consisting of a radio frequency receiver that is tuned to a fixed carrier frequency on which warning information is transmitted and this device is either initially built into an instrument, such as a radio receiver, or can be interconnected thereto. The device has a power amplification stage which controls switching means during the transmission of a warning signal and this means includes a switch connected in parallel with the regular on-off switch of the receiver so that the switch can turn on the receiver if required. In addition, the audio frequency output of the device is superimposed on a d.c. control voltage and this signal is fed to the deomdulating stage and audio amplification stage of the receiver. This is effective to suppress signals, which would normally be amplified in the amplification stage, and instead the warning signal is amplified and transmitted from an audio output means of the receiver.

While the following description of a preferred embodiment will be concerned with the use of the device with a radio receiver it should be stressed that the invention is equally applicable for use in any instrument having an audio frequency amplification capability.

BRIEF DESCRIPTION OF THE DRAWINGS

FIG. 1 is a schematic diagram of the circuits for the device interconnected to a conventional type radio receiver.

DESCRIPTION OF THE PREFERRED EMBODIMENTS

Referring now to the drawing, it may be seen that a conventional radio frequency receiver 10 is connected to a high frequency warning device or warning signal receiver and trigger 12 as described in detail below.

The receiver 10 generally includes an antenna 14 for receiving a radio frequency signal. A converter 16 is connected to the antenna and an intermediate frequency amplifier 18 is connected to the converter. An intermediate frequency amplifier transformer 20 has its input connected to the intermediate frequency amplifier and the output of the transformer 20 is connected to a tube 22 which is a part of an audio amplification stage 24 of the receiver. The audio amplification stage 24 is connected to a loudspeaker 26 which produces appropriate sound waves in a conventional manner. A rectifier 28 is connected to the intermediate frequency transfornner 20 and the audio stage 24 through a filter network to provide the necessary direct current plate and screen voltages. The rectifier 28 is connected to a plug 30 which is adapted for connection to a conventional 110 volt, 60-cycle electric current source.

Considering now the specific construction of the receiver, which construction is conventional for a radio receiver, a potentiometer 32 having a condenser 34 connected in parallel with it is connected to the output of the intermediate frequency transformer 20 and in a conventional manner, to ground. The tube 22 is a conventional tube which includes a detector or diode section 36 and a triode section which includes cathode 38, a plate 40 and a grid 42 between the plate and cathode, which grid is connected to the potentiometer 32 with a capacitor 44 in series therewith. The plate 40 is connected to a resistor 46 and a capacitor 48 which are in parallel. The plate 40 is also connected to a capacitor 50 which is connected to a resistor 52 and a capacitor 54 which are also connected in parallel and to ground at their opposite ends.

The audio amplification stage includes a pentode 56 which provides a power amplifier. The pentode includes a cathode 58 which is connected to a resistor 60 and a capacitor 62 which are connected in parallel and are connected to the grid 42 through a resistor 64 which resistor 64 is connected to ground. The cathode is also connected to resistor 52 and capacitor 54 through the resistor 60 and capacitor 62. The pentode 56 has its cathode 58 connected to a suppressor grid 66 in a conventional fashion. The capacitor 50 and the resistor 52 are connected to a control grid 68, and a screen grid 70 is connected to a plate voltage supply. A plate 72 in pentode 56 is connected to the loudspeaker 26 through an output transformer 73 which has a capacitor 75 connected in parallel with the input side of the transformer. A resistor 74, which is part of the filter network, is connected to the screen grid 70 and to the output transformer 73. A capacitor 76 is connected to the screen grid 70 and to ground, and a capacitor 78 is connected to the resistor 74 and to the loudspeaker 26 as well as to ground to complete the filter network.

The rectifier has a plurality of series elements 80 connected thereto, and the rectifier is connected to plug 30. Plug 30 is connected to ground through a switch 82 which controls the flow of current to the rectifier and to the set. The rectifier 28 supplies positive plate and screen voltages to all stages of the receiver. Plate voltage for tube 56 is taken directly from the rectifier and capacitor 78 while all other plate and screen voltages are taken from the filter network consisting of capacitors 76 and 78 and resistor 74. From the foregoing description, it is clear that the receiver 10 is conventional and its operation is conventional in that it includes a variable frequency detecting device.

The warning signal receiver and trigger 12 generally includes a loopstick antenna 110 which is connected to a tuned radio frequency amplification stage 112 and untuned amplification stage 114 is connected to the stage 112 so that the receiver 12 includes a fixed frequency detecting device. The untuned amplification stage 114 is connected to a trigger or power amplification stage 116 and grid 42 of audio stage 24. The trigger amplification stage 116 is connected to a relay 118 which is also connected to the grid 42. The relay is connected to the plug 30 and a power source 120 is connected to the three stages and to the relay. The power source is also connected to the plug 30.

Considering now the specific arrangement of the device 12 it may be seen from the drawing that the loopstick antenna 110 has a condenser 122 connected thereto with a trimmer condenser 124 which is a variable condenser connected in parallel to condenser 122 to provide a resonant circuit. The radio frequency amplification stage 112 includes a transistor 126 which has its base 128 connected to the antenna 110, its emitter 130 connected to a resistor 132 and a receiver common line 133. The resistor 132 has a capacitor 134 connected in parallel therewith and the resistor is connected to antenna 110 and to a resistor 135 which has its opposite end connected to power source 120. The transistor 126 has its collector 136 connected to a capacitor 138 and an adjustable capacitor 140 which is in parallel with capacitor 138 and capacitor 140 is a trimmer capacitor to tune the circuit consisting of capacitors 138 and 140 and an input coil of a transformer 142 for selective amplification of a signal received by the antenna 110. Capacitors 138 and 140 are also connected to the common line 133. The collector 136 is connected through the input of transformer 142 to the power source 120. The transformer 142 has its output side connected to a transistor 144 of the untuned amplification stage 114. The transistor 144 has a base 146 which is connected to the output of transformer 142 and an emitter 148 which is connected to a resistor 150 and a capacitor 152 as well as the common line 133. The resistor 150 and capacitor 152 are connected to the output of transformer 142 and to a resistor 154, which resistor has its other end connected to the power source. The transsistor 144 has a collector 156 which is connected to a resistor 158 and a capacitor 160. The capacitor 160 is connected to a diode 162 and a diode 164. The diode 164 is connected to a potentiometer 166 and a capacitor 168. A resistor 170 is connected to the capacitor 168 and in series to the potentiometer 166. The potentiometer 166 is connected to a conductor 172 which is connected to potentiometer 32 and capacitor 34. As was mentioned above the potentiometer 32 is connected to grid 42 through capacitor 44.

Diode 164 is also connected to a transistor 174 of the trigger amplification stage 116 which transistor 174 includes a base 176 connected to diode 164. The transistor 174 also includes an emitter 178 which is connected to the common line 133. A collector 180 in transistor 174 is connected through a coil 181 in relay 118 to the power source 120 and a capacitor 182 is in parallel with the coil 181. The relay 118 includes a two-position switch 184. The switch 184 includes a terminal 186 which is connected to a potentiometer 166 and to conductor 172 for reasons which will become apparent hereinafter. The switch has its common terminal 188 connected to a receiver ground. A third terminal 190 of the switch 184 is connected to the plug 30 for connection to a source of 110 volt 60-cycle current. The terminal 190 is also connected to an on-off switch 192 which is normally closed as shown in the drawings; however, when the switch 192 is open, the device 12 is de-energized. A transformer 194 has its input connected to switch 192 and to plug 30 for connection to a source of 110 volt 60-cycle current. The output side of the transformer 194 is connected to a diode 196 which diode 196 is connected to a capacitor 198 and a resistor 200 as well as resistor 135. Resistor 200 is connected to a capacitor 204 which is connected to capacitor 198 and the output of transformer 194. A resistor 206 is connected in parallel with the capacitor 204 and is connected to the resistor 200. To complete the power source, the plug 30 is connected to a source of electric energy having 60-cycles and at 110 volts, which source is not shown.

With switch 82 in the open position as shown in the drawing, set 10 is de-energized. If switch 192 were in an open position as shown in the dotted form, set 12 would also be de-energized. However, should switch 192 be placed in its closed position which would be the normally closed position set 12 would be energized.

When a signal at a proper frequency is received by the loopstick antenna 110 which defines a resonant circuit with the two capacitors 122 and 124, the signal is supplied to the input of the radio frequency amplification stage at the base 128 of transistor 126. The output of the transistor is tuned by the two capacitors 138 and 140 to make a second resonant circuit to increase selectivity of the device. The signal is then amplified in the radio frequency transformer and transmitted to the base 146 of the transistor 144 and the signal is detected in the diode 164 and applied to the base of transistor 174 for further amplification to operate the relay 118. When the relay is operated, the switch 184 disconnects terminal 186 and connects terminal 190. Because the switch is then in parallel with switch 82, receiver 10 is then energized in a conventional manner.

Since the unit 12 is always energized when switch 192 is closed, the signal received by the loopstick antenna 110 is always transmitted through the set. The signal from the diode 164 is impressed across the potentiometer 166 and the resistor 170. It may be noted that the common line 133 is at the same radio frequency potential as the ground line of the receiver because of capacitor 204, but has a direct current potential developed across the resistor 206. Inasmuch as the output of transformer 194 is 6.3 volts, it is evident that there is a direct current potential of approximately 10 volts across the resistors 200 and 206. However, there is also an approximately 5 volt direct current potential acrosss the resistor 206. The warning signal is superimposed on the direct current voltage developed across resistor 206 and capacitor 204 and is transmitted to stage 24 of the receiver along conductor 172 where the sum of the voltages is applied to the grid input resistor 64, the capacitor 44 and a portion of the receiver volume control, i.e. potentiometer 32, all of which are connected in series. The direct current components of the voltage are developed across the capacitor to bias the diode section of the tube 22 below the shutoff. The audio component of the voltage is amplified in the triode section and applied to the power amplifier. It is readily apparent that the direct current voltage biases the detector section of the tube 22 so that any noise or static picked up by the receiver will not be passed on to the audio section.

When the warning signal is no longer being received on the loopstick antenna, the switch 184 then moves into its normal position, that is, as shown in the solid form in contact with terminal 186. In the event that the switch 82 is open the set is turned off. However, if it is on, that is, switch 82 is closed, the potentiometer 32 is connected to ground as is potentiometer 166 and thus there is no biasing of the detector.

From the foregoing description, it is clear that a device embodying the present invention such as device 12 may be easily and simply connected to any conventional high frequency receiver such as device 10 to provide an effective warning device which is operative though the conventional receiver is turned off when a warning signal is broad cast.

While a specific embodiment of the hereindisclosed invention has been shown and described above, it is readily apparent that those skilled in the art may make various modifications and changes without departing from the spirit and scope of the present invention. Thus, for example, the conventional radio receiver may utilize solid-state components instead of tubes. It is believed well within the knowledge of those skilled in the art to modify the interconnected circuits so that it is not necessary to show a specific embodiment.

Also, while a source of power of 60-cycle a.c. current has been shown it is possible to operate the arrangement from a battery or other source of d.c. voltage and such could also be on a stand-by basis in case of an interruption in a normal power supply.

It will be understood that the above description of the present invention is susceptible to various modifications, changes and adaptations, and the same are intended to be comprehended within the meaning and range of equivalents of the appended claims.

We claim:

1. A radio receiver comprising in combination:

a. a first device having tuning means for selectively detecting the transmission of a plurality of audio frequency modulated radio frequency carrier signals of different carrier frequencies, said device having a first circuit for demodulating said signals, a second circuit connected to said first circuit to amplify the demodulated signals, and audio output means connected to said second circuit;

b. a second device fixedly tuned to detect only an audio frequency modulated radio frequency carrier signal transmitted at a preselected fixed carrier frequency, said second device having another circuit for demodulating the signal transmitted at such fixed frequency, and a power amplification stage connected to said another circuit for producing an output signal proportional to the detected fixed frequency signal; and c. a power supply with on-off switch for energizing said first and second devices, and d. switching means connected between said first device and said power amplification stage and switchable only in response to the production of an output signal by said power amplification stage, said switching means including a two-position switch, said switch being in a first position in the absence of an output signal by said amplification stage, said switch being in a second position when said switching means receives said output signal, said switch in said second position providing a power lead from said power supply bypassing its on-off switch to energize said first device, and said switch in said second position also applying the signal transmitted at the fixed frequency to said second circuit and blocking the transmission of signals from said first circuit to said second circuit.

2. A radio receiver comprising in combination:

a. a first device having tuning means for selectively detecting the transmission of a plurality of audio frequency modulated radio frequency carrier signals of different carrier frequencies, said device having a first circuit for demodulating said signals, a second circuit connected to said first circuit to amplify the demodulated signals, and audio output means connected to said second circuit;

b. a second device fixedly tuned to detect only an audio frequency modulated radio frequency carrier signal transmitted at a preselected fixed carrier frequency, said second device having another circuit for demodulating the signal transmitted at such fixed frequency, and a power amplification stage connected to said another circuit for producing an output signal proportional to the demodulated audio frequency information;

c. a power supply with on-off switch for energizing said first and second devices d. switching means movable from a first to a second position in response to an output signal received from said power amplification stage; and e. a third circuit connected in series between said another circuit and said first and second circuits only when said switching means is in said second position, said switching means in said second position completing a power supply circuit for said first device bypassing said on-off switch of said power supply, whereby, when said second device detects a transmission of a signal at the preselected fixed carrier frequency, said switching means is moved to said second position and the transmission of signals between said first and said second circuits is suppressed, and the demodulated signal received from said another circuit is amplified in said second circuit and emitted from said audio output means.

3. A radio receiver as defined in claim 2, wherein said another circuit includes a diode.

4. A radio receiver as defined in claim 2, wherein said third circuit is operatively shorted out when said switching means is in said first position.

5. A radio receiver as defined in claim 2, wherein one circuit of the connection between said first circuit and said second circuit includes said switching means in said first position.

6. A radio receiver as defined in claim 2, wherein said third circuit includes a parallel connection of capacitor and resistor across which a direct current voltage is developed and the demodulated signal in said second device is superimposed on the direct current voltage.

7. A combination as in claim 6, wherein the direct current component is developed across a condenser in the connection between said first circuit and said second circuit to bias said first circuit to cut off.

8. A combination as in claim 6, wherein the demodulated signal component is applied to an input resistor of said second circuit and the demodulated signal is amplified in said second circuit.

9. A combination as in claim 8, wherein said third circuit includes a potentiometer whereby the volume of the demodulated signal emitted from said audio output means can be varied.

* * * * *

UNITED STATES PATENT OFFICE
CERTIFICATE OF CORRECTION

Patent No. 3,737,786 Dated June 5, 1973

Inventor(s) John J. McDermott and Francis M. Macken

It is certified that error appears in the above-identified patent and that said Letters Patent are hereby corrected as shown below:

Column 6, lines 27-28, Claim 1, Subparagraph c. "a power supply with on-off switch for energizing said first and second devices, and" should read --a power supply with an on-off switch for energizing said first device and another on-off switch for energizing said second device, and--

Column 6, lines 63-64, Claim 2, Subparagraph c. "a power supply with on-off switch for energizing said first and second devices" should read --a power supply with an on-off switch for energizing said first device and another on-off switch for energizing said second device;--

Signed and sealed this 5th day of February 1974.

(SEAL)
Attest:

EDWARD M.FLETCHER,JR.
Attesting Officer

RENE D. TEGTMEYER
Acting Commissioner of Patents